US008305504B2

(12) United States Patent
Shen et al.

(10) Patent No.: US 8,305,504 B2
(45) Date of Patent: Nov. 6, 2012

(54) POLARIZATION CONTROL SYSTEMS AND METHODS WITH ENDLESS POLARIZATION TRACKING USING A DITHERING ALGORITHM

(75) Inventors: Yunfeng Shen, Bethesda, MD (US); Shan Zhong, Ellicot City, MD (US); Xiumin Liu, Ellicott City, MD (US)

(73) Assignee: Ciena Corporation, Hanover, MD (US)

( * ) Notice: Subject to any disclaimer, the term of this patent is extended or adjusted under 35 U.S.C. 154(b) by 682 days.

(21) Appl. No.: 12/499,678

(22) Filed: Jul. 8, 2009

(65) Prior Publication Data

US 2011/0007232 A1   Jan. 13, 2011

(51) Int. Cl.
*G02F 1/1335* (2006.01)
(52) U.S. Cl. .............................. 349/18; 349/96; 349/187
(58) Field of Classification Search .................... 349/18, 349/96, 187, 117; 359/246, 239; 250/225
See application file for complete search history.

(56) References Cited

U.S. PATENT DOCUMENTS

| 7,035,009 B1 * | 4/2006 | Kelly et al. .............. 359/484.06 |
| 2002/0109901 A1 * | 8/2002 | Suh et al. ...................... 359/281 |

OTHER PUBLICATIONS

The Berek Polarization Compensator, Patent #5,245,478; Model 5540 User's Manual; Berek, M., Zbl. Miner. Geol. Paldont. 388,427, 474,580 (1913) (quoted in Born, M. and Wolf, E., Principles of Optics, 6th edition, Pergamon Press, London, 1980, p. 694); Dodge, M., Appl. Opt. 23,Dec. 1980-1985 (1984).
Fred Heismann, Member IEEE; "Analysis of a Reset-Free Polarization Controller for Fast Automatic Polarization Stabilization in Fiber-optic Transmission Systems"; Journal of Lightwave Technology, vol. 12, No. 4, Apr. 1994.
Peter Oswald and Christi K. Madsen, Senior Member, IEEE, Fellow OSA; Deterministic Analysis of Endless Tuning of Polarization Controllers; Journal of Lightwave Technology, vol. 24, No. 7, Jul. 2006—IEEE.
Nigel G. Walker and Graham R. Walker; "Polarization Control for Coherent Communications"; Journal of Lightwave Technology, vol. 8, No. 3, Mar. 1990—IEEE.

* cited by examiner

*Primary Examiner* — Thoi Duong
(74) *Attorney, Agent, or Firm* — Clements Bernard PLLC; Christopher L. Bernard; Lawrence A. Baratta, Jr.

(57) ABSTRACT

The present disclosure includes a configuration of a polarization control system and an algorithm that realize fast polarization controlling and tracking while avoiding the Glitch problems (i.e., loss of polarization tracking). The polarization controller includes multiple stages along with tunable orientation and retardation angles. The retardation angles are initialized to at least two different values for better polarization tracking in normal mode. In a normal mode, only the orientation angles of the polarization controller are dithered. When the monitored error is higher than the threshold, the polarization controller enters a glitch mode, and Glitch detection can be improved through error signal data processing. In the Glitch mode, at least one retardation angle is dithered along with the orientation angles. After the Glitch problem is avoided, the polarization controller stops dither the retardation angles and move all wave plates back to their initial values, and the polarization controller enters the normal mode.

20 Claims, 7 Drawing Sheets

POLARIZATION CONTROL SYSTEMS AND METHODS WITH ENDLESS POLARIZATION TRACKING USING A DITHERING ALGORITHM

FIELD OF THE INVENTION

The present invention relates generally to optical communication systems. More particularly, the present invention relates to a polarization control system and a polarization control method that realize fast polarization controlling and tracking while avoiding glitch problems (i.e., loss of polarization tracking) utilizing a dithering technique to adjust a polarization controlling device.

BACKGROUND OF THE INVENTION

Controlling the state of polarization (SOP) of optical signals in optical communication systems is an important and challenging problem that has been the subject of research for many years. The control of SOP is required in many applications such as polarization mode dispersion (PMD) compensation, polarization-division multiplexing (Pol-Mux) transmission, coherent detection, and the like. The birefringence of optical fiber supports two polarization modes, each having different propagation velocities, giving rise PMD. PMD is a limiting factor for high speed optical communication systems, i.e. 10 Gb/s and beyond. For a first order approximation, the PMD of fiber can be described by the parameters of differential group delay (DGD) and principal states of polarization (PSPs). An input optical pulse whose state of polarization (SOP) is aligned with one of the fiber's two input PSPs comes out of the fiber without distortion. An input optical pulse aligned with neither input PSP emerges as two orthogonally polarized pulses, separated in time by the fiber's DGD. Both DGD and PSPs of optical fiber vary randomly with time due to environmental factors and the like. Optical PMD compensators have been proposed to mitigate the effects of PMD. These compensators usually include polarization controller(s) and fixed or variable DGD component(s). A control loop is usually set up to control the polarization controller to minimize the PMD effect based on some error signal.

Polarization can be used as a degree of freedom of an electromagnetic field. Polarization multiplexing can double the capacity of a wavelength channel and spectral efficiency by transmitting two optical signals at the same wavelength with orthogonal SOPs. At the end of the transmission line and before the receiver, the two optical signals with orthogonal SOPs need to be de-multiplexed with a polarization splitter. Because the SOPs of the optical signals after fiber transmission are random and time varying, polarization control is needed before the polarization splitter to transfer the SOPs of signals to the required SOP by the polarization splitter. Coherent detection is a scheme that allows a complete retrieval of both amplitude and phase of optical signals by mixing the input optical signal with a local optical signal called an oscillator before optical detection. Therefore high receiver sensitivity can be achieved with coherent detection. Traditional coherent detection requires a match of SOPs between the signal and the local oscillator, which again requires the control of SOP.

All these applications of the polarization controlling demand the feature of "endless control", which means the optical components acting on the SOP have to be unlimited. When the SOP of the input signal drifts in one direction monotonically, the polarization controller should be able to track the SOP evolution without discontinuity. If reset is needed for the controlling parameters somewhere during the SOP tracking, the reset process should not cause any SOP discontinuity as well. Polarization controlling can be achieved through many tunable mechanically or electrically driven components based on variety of materials or configuration, for example, cascaded electromagnetic fiber squeezers, endlessly rotatable optical retardation plates, liquid crystal polarization rotators or guided-wave electro-optic devices. All of these components can be modeled as wave plates with variable orientation angles and/or variable retardation angles. The basic configurations can be divided into three classes: wave plates with variable orientation angles; wave plates with variable retardation angles (or called linear retarders), and wave plates with both variable orientation angles and variable retardation angles (such as Soleil-Babinet compensators). Regarding the polarization controlling speed, the fastest polarization controlling device so far is the integrated electro-optic controller based on x-cut, z-propagation lithium niobate which includes a cascade of integrated polarization transform stages, each acting as a variable retardation wave-plate with adjustable orientation angle.

There is a problem referred to herein as Glitch that is a loss of polarization tracking due to a dithering algorithm failure that can occur in certain configurations of a polarization controlling device. There exists a need for polarization control systems and methods utilizing an algorithm that can provide "endless control" without ever losing polarization tracking.

BRIEF SUMMARY OF THE INVENTION

In various exemplary embodiments, the present invention provides polarization control systems and methods that realize fast polarization controlling and tracking while avoiding the Glitch problem of loss of polarization tracking. The present invention includes a configuration of a polarization control system and an associated dithering algorithm. There are two working modes for the polarization controller: a normal mode and a glitch mode. The polarization controller includes multiple stages along with tunable orientation angles and retardation angles. The retardation angles are initialized to at least two different values for better polarization tracking in normal mode. In the normal mode, only the orientation angles of the polarization controller are dithered. When the monitored error is higher than a threshold, the polarization controller enters the glitch mode. The Glitch detection can be improved through error signal data processing. In Glitch mode, at least one retardation angle is dithered along with the orientation angles. After the Glitch problem is avoided, the polarization controller stops dithering the retardation angles and move all the retardation angles back to their initial values. After all the retardation angles are moved back to their initial values, the polarization controller returns back to the normal mode.

In an exemplary embodiment of the present invention, a polarization control system includes a polarization controlling device with variable orientation angles and variable retardation angles; an error signal detector configured to detect an error signal associated with the polarization controlling device; and a control algorithm configured to execute a dithering algorithm on the polarization controlling device responsive to the error signal. The polarization controlling device include any mechanically or electrically driven component that can be modeled as a plurality of wave plates with variable orientation angles and variable retardation angles. The plurality of wave plates can include at least four. The polarization controlling device can be one of a cascaded electromagnetic fiber squeezer, an endlessly rotatable optical retardation plate, a liquid crystal polarization rotator, and a guided-wave electro-optic device. The variable retardation angles are initialized to at least two different values. The control algorithm is configured to: operate normally by dithering the variable orientation angles responsive to the error signal; upon detection of Glitch, operate by dithering the variable orientation angles and at least one of the variable retardation angles responsive to the error signal; and upon Glitch correction, stop dithering the at least one of the variable retardation angles and operate normally by dithering the variable orientation angles responsive to the error signal. The control algorithm is further configured to return the at least one of the variable retardation angles to one of the at least two different values upon the Glitch correction. The detection of Glitch includes one of setting an error signal threshold whereby Glitch is detected once the error signal reaches the error signal threshold and monitoring trends of the error signal through curve fitting. The dithering algorithm includes adjusting a parameter associated with the polarization controlling device in a predetermined amount in both a positive direction and a negative direction; measuring the error signal at each of an initial unadjusted position, the positive direction, and the negative direction; and setting the parameter to minimize the error signal.

In another exemplary embodiment of the present invention, a polarization control method includes initializing retardation angles of a polarization controller to at least two different values; operating the polarization controller by dithering orientation angles of the polarization controller to minimize an error signal associated with the polarization controller; responsive to detecting Glitch, operating the polarization controller by dithering orientation angles of the polarization controller and at least one retardation angle to minimize an error signal associated with the polarization controller; and responsive to correcting the Glitch, stopping dithering of the at least one retardation angle and operating the polarization controller by dithering orientation angles of the polarization controller to minimize an error signal associated with the polarization controller. The polarization control method further includes resetting the at least one retardation angle to one of the at least two different values. The polarization control method also further includes detecting an error signal of the polarization controller; and performing the dithering orientation angles and the at least one retardation angle responsive to the error signal. The detecting Glitch includes one of setting an error signal threshold whereby Glitch is detected once the error signal reaches the error signal threshold and monitoring trends of the error signal through curve fitting. The polarization controller can be any mechanically or electrically driven component that can be modeled as a plurality of wave plates with variable orientation angles and variable retardation angles. The plurality of wave plates includes at least four. The dithering includes adjusting an angle value in a predetermined amount in both a positive direction and a negative direction; measuring the error signal at each of an initial unadjusted position, the positive direction, and the negative direction; and setting the parameter to minimize the error signal.

In yet another exemplary embodiment of the present invention, a dithering polarization control method includes setting retardation angles on a plurality of wave plates to at least two different values; monitoring an output of the plurality of wave plates to derive an error signal; for each orientation angle for each of the plurality of wave plates performing the steps of adding a dither value to a current value and measuring the error signal, subtracting the dither value from the current value and measuring the error signal, and setting a new value based on the minimum error signal between the current value, the added dither value, and the subtracted dither value; monitoring for glitch; and if glitch is detected, for each retardation angle for each of the plurality of wave plates performing the steps of adding a dither value to a current value and measuring the error signal, subtracting the dither value from the current value and measuring the error signal, and setting a new value based on the minimum error signal between the current value, the added dither value, and the subtracted dither value. The dithering polarization control method further includes slowly resetting each retardation angle for each of the plurality of wave plates to the at least two different values. The detecting Glitch includes one of setting an error signal threshold whereby Glitch is detected once the error signal reaches the error signal threshold and monitoring trends of the error signal through curve fitting. The polarization controller can be any mechanically or electrically driven component that can be modeled as a plurality of wave plates with variable orientation angles and variable retardation angles.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides polarization control systems and methods that realize fast polarization controlling and tracking while avoiding the Glitch problem of loss of polarization tracking. The present invention includes a configuration of a polarization control system and an associated dithering algorithm. There are two working modes for the polarization controller: a normal mode and a glitch mode. The polarization controller includes multiple stages along with tunable orientation angles and retardation angles. The retardation angles are initialized to at least two different values for better polarization tracking in normal mode. In the normal mode, only the orientation angles of the polarization controller are dithered. When the monitored error is higher than a threshold, the polarization controller enters the glitch mode. Glitch detection can be improved through error signal data processing. In the Glitch mode, at least one retardation angle is dithered along with the orientation angles. After the Glitch problem is avoided, the polarization controller stops dithering the retardation angles and moves all the retardation angles back to their initial values. After all the retardation angles are moved back to their initial values, the polarization controller returns back to the normal mode.

Figure 1:
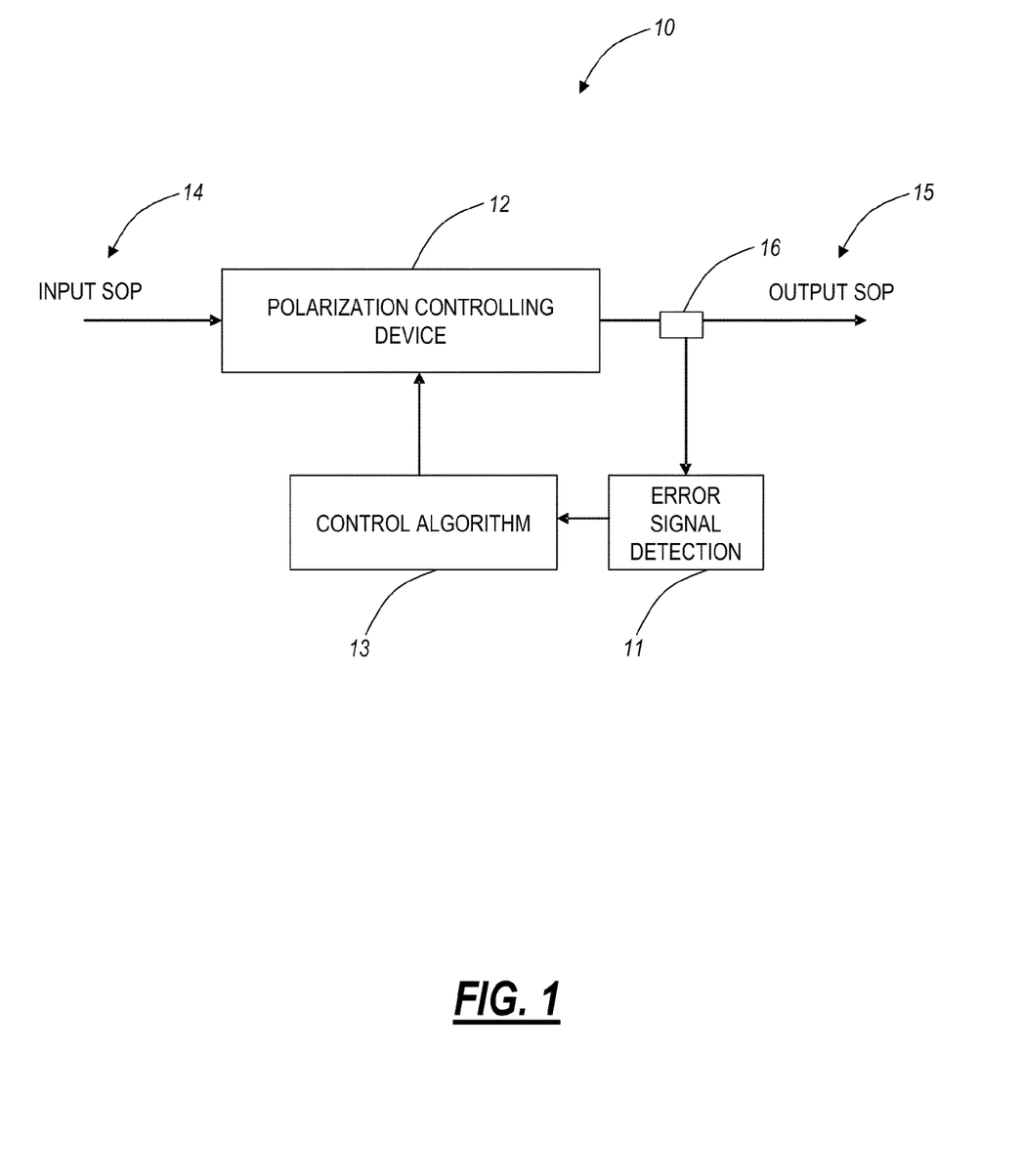
FIG. 1 is a polarization control system for controlling SOPs according to an exemplary embodiment of the present invention.

Referring to FIG. 1, a polarization control system 10 is illustrated for controlling SOPs according to an exemplary embodiment of the present invention. At the functional level, the polarization control system 10 is also called polarization transformer, polarization tracker, or polarization stabilizer somewhere based on the specific applications. The polarization control system 10 includes a measurement process that provides error signal detection 11, a polarization controlling device 12 with variable wave plates or equivalent, and a control algorithm 13 which controls variable parameters of the wave plates or equivalent to transfer an input SOP 14 to a target output SOP 15 based on the error signal from the error signal detection 11. The error signal detection 11 can include an optical detecting device (e.g., photo detector) that reports the error signal value to the control algorithm 13. In operation, the polarization control system 10 receives an optical signal with the input SOP 14 that is input to the polarization controlling device 12. The polarization controlling device 12 adjusts the polarization of the optical signal and outputs the optical signal with the output SOP 15. The settings of the polarization controlling device 12 are based on the control algorithm 13. The optical signal with the output SOP 15 is tapped with an optical tap 16 at the output of the polarization controlling device 12. This tap 16 connects to the error signal detection 13 which utilizes this output to drive the control algorithm 13. For example, the polarization control system 10 operates a feedback loop that controls various parameters associated with the polarization controlling device 12 based on the error signal detection 11 and the control algorithm 13.

As described herein, all polarization controlling devices such as the polarization controlling device 12 can be modeled as wave plates with variable orientation angles and/or variable retardation angles. Those of ordinary skill in the art will recognize that discussion herein related to variable orientation angles and/or variable retardation angles is done based on the actual physical implementation of the polarization controlling device 12 and the equivalent parameters represented by the orientation angles and/or variable retardation angles. It has been shown in Nigel G. Walker and Graham R. Walker, "Polarization Control for Coherent Communications", J. Lightwave Technology, Vol. 8, No. 3, pp. 438-458, 1990, that endless control between a time-varying SOP and a fixed SOP can be achieved by controlling the orientation angles of a combination of two quarter-wave plates, or one quarter-wave plate and one half-wave plate. Quarter-wave and half-wave plates are wave plates with fixed retardation angle of 90 degree and 180 degrees respectively. However, there is no tolerance on the retardation angles for these wave plate combinations, so the wave plate elements must be precisely calibrated in order to achieve accurate endless SOP matching. It was also shown in Fred Heismann, "Analysis of a Reset-Free Polarization Controller for Fast Automatic Polarization Stabilization in Fiber-optical Transmission Systems", J. Lightwave Technology, Vol. 12, No. 4, pp. 690-699, 1994, that any automatic polarization controller with only two independent control variables faces situations, in which small changes in the input SOP require large changes in the control variables. These undesired large control variable changes can be avoided by introducing more independent variable wave plates in the control algorithm 13. It was shown in Peter Oswald and Christi K. Madsen, "Deterministic Analysis of Endless Tuning of Polarization Controllers", J. Lightwave Technology, Vol. 24, no. 7, pp. 2932-2939, 2006, that at least four variable parameters are needed to achieve the transformation from arbitrary SOP to fixed SOP.

The control algorithm 13 has to make sure the polarization tracking is endless in all conditions. There are two basic types of the control algorithm 13: a deterministic algorithm and a dithering algorithm. The deterministic algorithm monitors the input/output SOP and current settings of the wave plates in the polarization controlling device 12, and then computes and changes the new settings for the wave plates accordingly to track the SOP changes. The deterministic algorithm needs high computation power and/or a long time to obtain the new settings of the wave plates. It is usually very complex in order to cover all possible input/output SOP conditions. On the contrary, the dithering algorithm is a very simple but powerful algorithm. The dithering algorithm dithers every control parameter up and down by a defined dither step, and compares the new detected error signals with the previous error signal level. The dithering algorithm then finds out the minimum error signal levels from these three levels and sets the value of this control parameter to the value that gives the minimum error signal. This algorithm is robust because it always tries to get closer to the optimal point. The dithering algorithm does not require precise calibration of the characteristics of the polarization controlling device 12 as long as there is enough control parameters to compensate for the uncovered ranges of some parameters. The dithering algorithm also does not need real time computation of complex matrix transformation, so is usually faster than the deterministic algorithm.

Figure 2A:
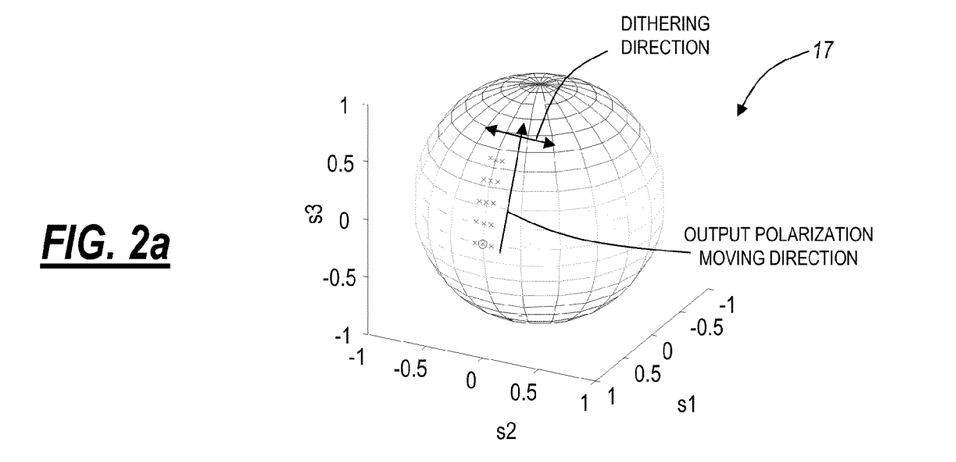
FIGS. 2a-2c are Poincare sphere graphs for typical configurations of the polarization controlling device of FIG. 1.

However, a Glitch problem can happen in polarization controlling using the dithering algorithm. The Glitch problem is defined as the loss of tracking due to a dithering algorithm failure. This is different from the loss of tracking due to the slow tracking speed of the polarization controlling device 12. It only happens when some special conditions are met, such as the status of input SOP and the wave-plate setting. When it happens, the dithering algorithm can not converge to transform the input SOP to the target SOP. Glitch could last for a relative long time, no matter how many dithering steps it takes or how fast it dithers, until the input SOP moves into the region that the dithering algorithm works again. Studies have shown that Glitch problem could happen in all configurations of the polarization controlling device 12, including three typical configurations described in FIGS. 2a-2c Referring to FIGS. 2a-2c, Poincare sphere graphs 17, 18, 19 are illustrated for typical configurations of the polarization controlling device 12. A first configuration (referred to hereinafter as Configuration I) is commonly used for polarization tracking by dithering orientation angles of cascaded quarter wave plates. The Glitch problem can happen when all dithering wave plates happen to be aligned in the same direction, i.e., all orientation angles are the same or have a difference of n*180 degrees where n is any integer (or n*π radian). For example, a Glitch problem happens when all angles of four quarter wave plates are aligned at 45 degrees (or π/2 in radian), and the input signal SOP is at horizontal linear polarization (which has a coordinates of (1,0,0) on the Poincare Sphere 17), and the input signal moves in the S1-S3 plane on the Poincare sphere, as shown in FIG. 2a. The reason of the Glitch problem is that the dithering directions of all the four quarter wave plates are all in the same direction in the S1-S2 plane. When the input SOP moves out from the target SOP (1,0,0) and moves in the S1-S3 plane, the moving direction of output SOP is orthogonal to the dithering direction of the wave plates. The tracking algorithm finds out that the original orientation angles (90 degree) are always the optimal state among the three dithering states: 45−dither_step, 45, and 45+dither_step degrees. So the orientation angles are kept at these values (45 degrees) and the polarization tracker fails to track the input SOP change. The polarization tracker has a higher and higher error between the output polarization and the target polarization until the input SOP moves out from the S1-S3 plane. It can be found that similar Glitch problem can happen in the configuration of any number of cascaded wave plates with variable orientation and any fixed retardation angles. These Glitch problems can be solved by adding the dithering of retardation angles of the wave plates.

Figure 2B:
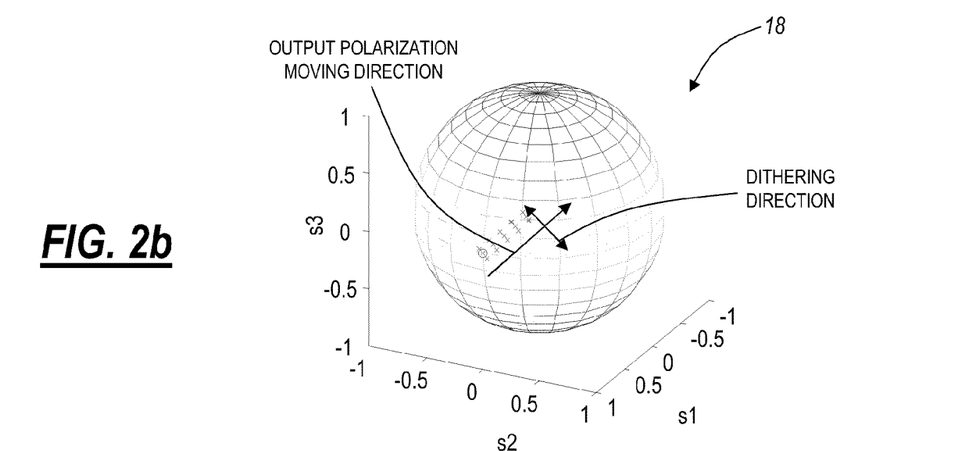

Another Glitch problem can happen to the Configuration I of the polarization controlling device 12. When the orientation angles of four quarter wave plates are 0, 90, 0 and 90 degrees, respectively, a Glitch problem happens if the input SOP is at horizontal linear polarization and moves in the 45 degrees direction in the S2-S3 plane, as shown in FIG. 2b. The dithering direction of the orientation angles is also orthogonal to the moving direction of the output SOP in this case. The tracking algorithm always finds the current orientation angles are the optimal states during the dithering process, and is not able to track the output polarization change. Because the input SOP is on or close to the PSPs of the quarter wave plates, dithering retardation angles are not able to solve this glitch problem. This can be solved by changing some of the quarter wave plates to half wave plates.

Figure 2C:
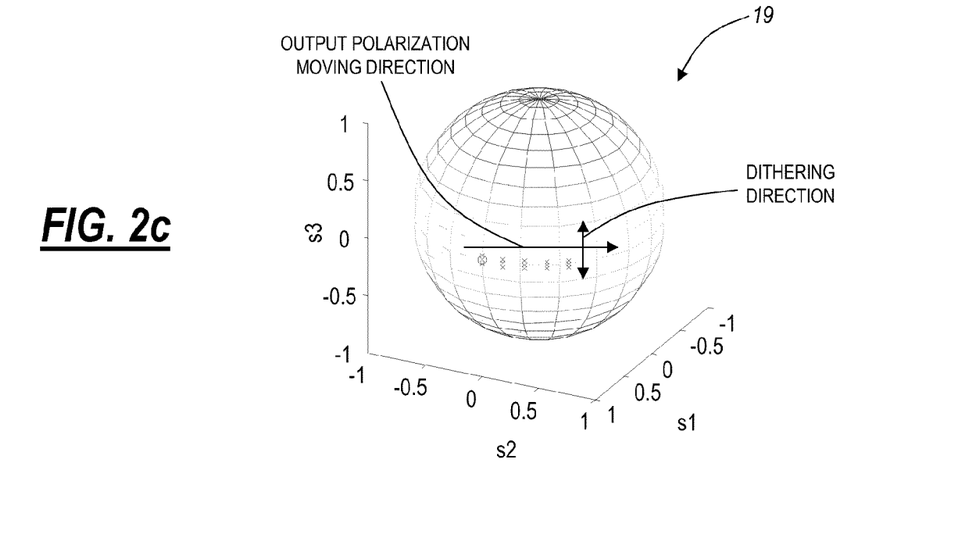

Another widely used configuration (referred to hereinafter as Configuration II) of polarization controlling device 12 includes four wave plates with variable retardation angles aligned in 0 and 45 degree of orientation angles alternatively. A Glitch problem can happen in this configuration when all retardation angles of the wave plates are at 0 or 180 degrees (or n*180 degree where n is an integer), and when the signal input SOP is horizontal linear polarization (S1) and moves in the S1-S2 equator on the Poincare sphere 19, as shown in FIG. 2c. The dithering direction of the retardation angles of all the wave plates is orthogonal to the S1-S3 plane, which is the moving direction of the output SOP. The algorithm finds out the original 0 degrees of retardation angle is the optimal state among the three dithering states, and fails to track the output SOP change. Similar glitch problems can happen in the configuration of any number of cascaded wave plates with variable retardation angle and with any fixed orientation angles. In order to prevent these Glitch problems, the retardation angles must be controlled not to be 0 or 180 degrees at the same time.

A third configuration (referred to hereinafter as Configuration III) is based on a number of cascaded wave plates with both variable retardation angles and variable orientation angles. Dithering both orientation angles and retardation angles gives two sets of parameters to dither and means more flexible and robust to the polarization tracking. However, it does not mean this configuration is immune to the Glitch problem. When the retardation angles of all wave plates are dithered to 0 degrees, similar Glitch problems as shown in FIG. 2c can happen because the dithering of orientation angles do not have any effect on output SOP when the retardation angles are 0s. Even when the retardation angles are not 0s, the Glitch problem can still happen in the configuration of dithering both orientation and retardation angles. For a concatenation of four wave plates with variable retardation and orientation angles, the Glitch problem can happen when all retardation angles happen to be dithered to 90 degrees (quarter wave plates) and the orientation angles of the wave plates are 0, 90, 0 and 90 degrees, respectively. If the input SOP is horizontal linear polarization and moves in the S1-S3 plane, similar Glitch problem as shown in FIG. 2b can happen. The reason of the Glitch problem is that the dithering of retardation angles do not have effect on the output SOP because the input SOP is on or close to the PSPs of the wave plates and the dithering of the orientation angles are all at a same direction.

Thus, the exemplary Configurations I, II, and III demonstrate that if all variable parameters of the polarization controlling device 12, including retardation angles and/or orientation angles, fall in the same direction on the Poincare sphere 17, 18, 19, Glitch can happen when the signal input SOP moves in the direction that is orthogonal to the dithering direction. Since the dithering is not able to yield the right error signal for polarization controlling device 12 to act correctively, the dithering algorithm fails to track and lock the input SOP.

In various exemplary embodiments, the present invention solves the Glitch problem by ensuring there are always a dithering that can move the output SOP on orthogonal or near orthogonal directions. In order to do orthogonal dithering, the dithering algorithm must follow all of the following rules. First, the retardation angles of the wave plates can not be all 0 or 2 nπ (where n is any integer). This means there should not be free dithering of retardation angles. The retardation angles must be fixed or controlled at values other than 0 or 2 nπ. Next, if retardation angles are not dithered freely, orientation angles have to be dithered freely to obtain endless control of polarization. Third, dithering of orientation angles only while keeping retardation angles fixed is not good enough for polarization tracking. The Glitch problems can happen when all orientation angles are the same. So dithering of orientation angles must be combined with controlled dithering of retardation angles. Finally, when dithering both orientation angles and retardation angles, there should be at least two different retardation angles. Otherwise, there can still be glitch problems.

Figure 3:
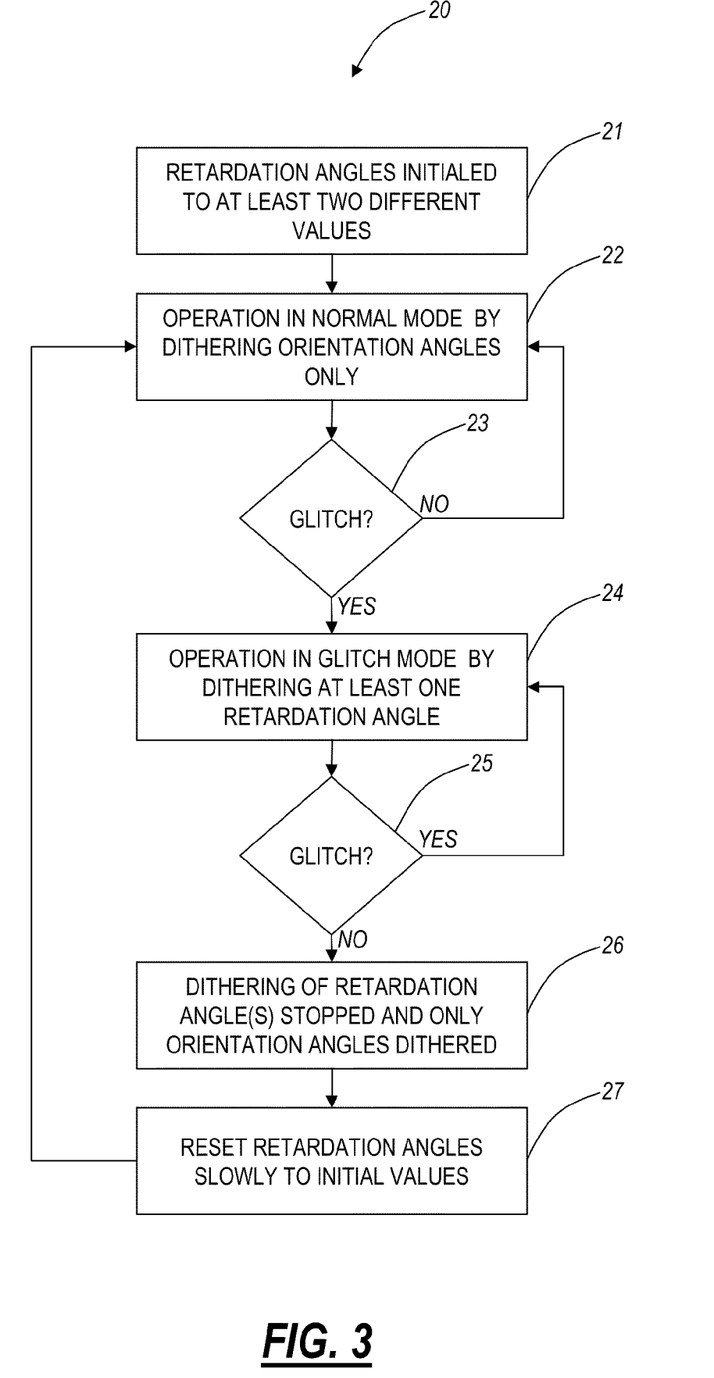
FIG. 3 is a flowchart of a dithering algorithm for polarization tracking which can eliminate the Glitch problem and provide endless tracking according to an exemplary embodiment of the present invention.

Referring to FIG. 3, a flowchart illustrates a dithering algorithm 20 for polarization tracking which can eliminate the Glitch problem according to an exemplary embodiment of the present invention. The dithering algorithm 20 can operate on the polarization control system 10. Specifically, the polarization controlling device 12 includes at least four wave plates or equivalent and each wave plate includes tunable orientation angles and retardation angles. The dithering algorithm 20 utilizes tuning of the retardation angles to overcome the Glitch problem. The polarization controlling device 12 can include any tunable mechanically or electrically driven component based on a variety of materials or configuration, for example, cascaded electromagnetic fiber squeezers, endlessly rotatable optical retardation plates, liquid crystal polarization rotators, guided-wave electro-optic devices, or the like. Also, the polarization controlling device 12 requires both variable orientation angles and variable retardation angles (such as Soleil-Babinet compensators).

Initially, the retardation angles are initialized to at least two different values (step 21). For example, some of the retardation angles are initialized to π/2 (quarter wave-plates) while others are initialized to π (half-wave-plates). There are two working modes for the polarization controlling device 12: a normal mode and a glitch mode. In the normal mode, the retardation angles of the wave-plates are fixed to their initial value while the orientation angles are dithered freely (step 22). The polarization controlling device 12 should be able to track the input polarization in most times by dithering the orientation angles only. When the Glitch problem starts to happen (step 23), the working mode changes from normal mode to Glitch mode. The Glitch problem can be detected by monitoring the error signal through an optimized algorithm. In Glitch mode, at least one retardation angle is dithered along with the orientation angles (step 24). This dithering of retardation angle(s) solves the Glitch problem. When the Glitch problem is solved, the dithering of the retardation angle(s) is stopped, and only orientation angles are dithered (step 26). The retardation angles that were dithered during the glitch condition are reset slowly to their initial value (step 27). The slow reset changes the output polarization. However, this change can be compensated by the dithering of the orientation angles. After all the retardation angles are reset to their initial values, the polarization controller moves back to the normal working mode (step 22).

Figure 4:
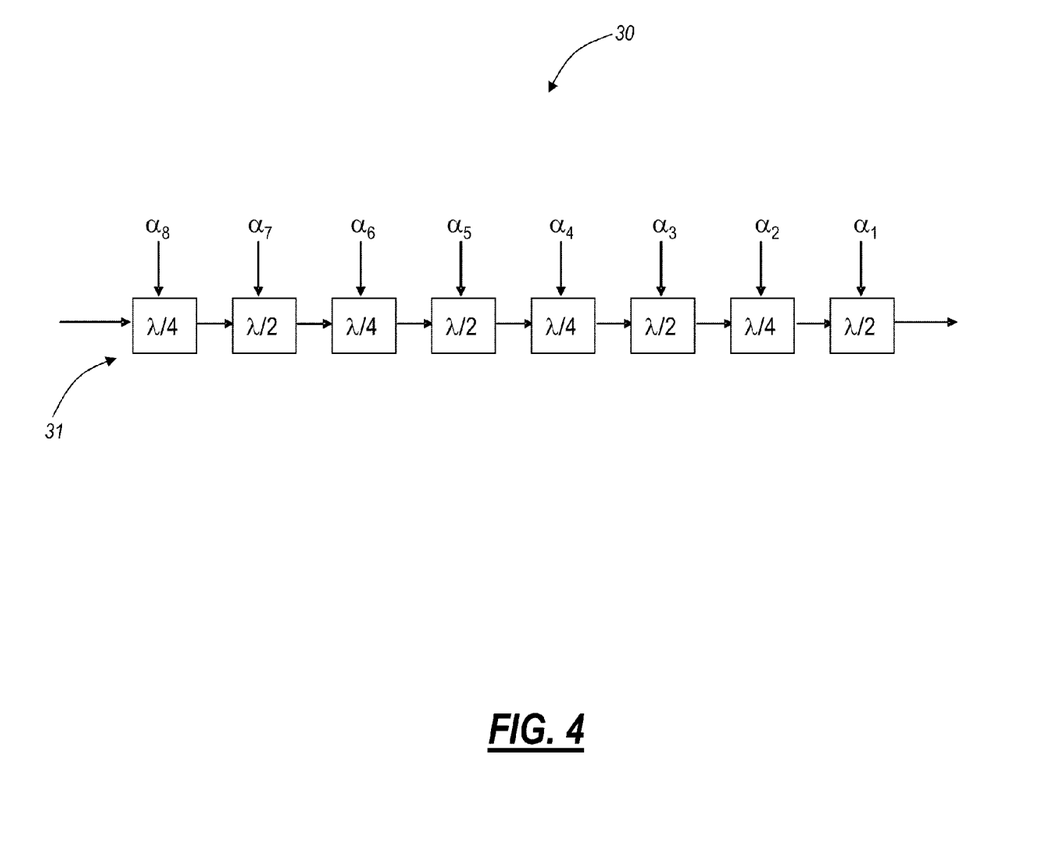
FIG. 4 is an eight-stage Lithium Niobate (LiNbO$_3$) polarization controller for implementing the dithering algorithm of FIG. 3 according to an exemplary embodiment of the present invention.

Referring to FIG. 4, the dithering algorithm 20 can be implemented on an exemplary polarization controlling device 12 that is an eight-stage Lithium Niobate (LiNbO$_3$) polarization controller 30. The more stages the polarization controlling device 12 has, the lower probability of the Glitch problem in the normal working mode. The LiNbO$_3$ polarization controller 30 includes eight wave plates 31 that can be configured as quarter, half, quarter, half, quarter, half, quarter, and half wave-plates initially. In the normal mode, only the orientation angles of the wave-plates are dithered to track the input polarization change. The error signal is monitored during the tracking as well as the value of the orientation angles. Once the Glitch mode is triggered by a certain error signal level with pre-defined threshold or other optimized algorithms, the dithering algorithm 20 starts to dither the retardation angles and orientation angles of all wave plates 31. The Glitch problem should be avoided, solved or mitigated soon after the Glitch mode starts. When the Glitch problem is confirmed over, the dithering algorithm 20 stops dithering retardation angles and start to move all the wave plates 31 back to their initial values with respect to the retardation angles. This moving back process should be in smaller pace, causing no outage of output SOP. After all retardation angles are moved back to their initial value, the polarization controller 30 is back to the normal mode. It is important to point out that the dithering algorithm 20 should tolerate long enough time for all wave plates to move back before next Glitch problem shows up. And this requirement for low Glitch probability has been met fully based on the multiple stage wave plate design (i.e., at least four wave plates 31). Also, the multiple stage wave plate design keeps the probability of Glitch lower enough for smooth transition between normal mode and Glitch mode.

Figure 5:
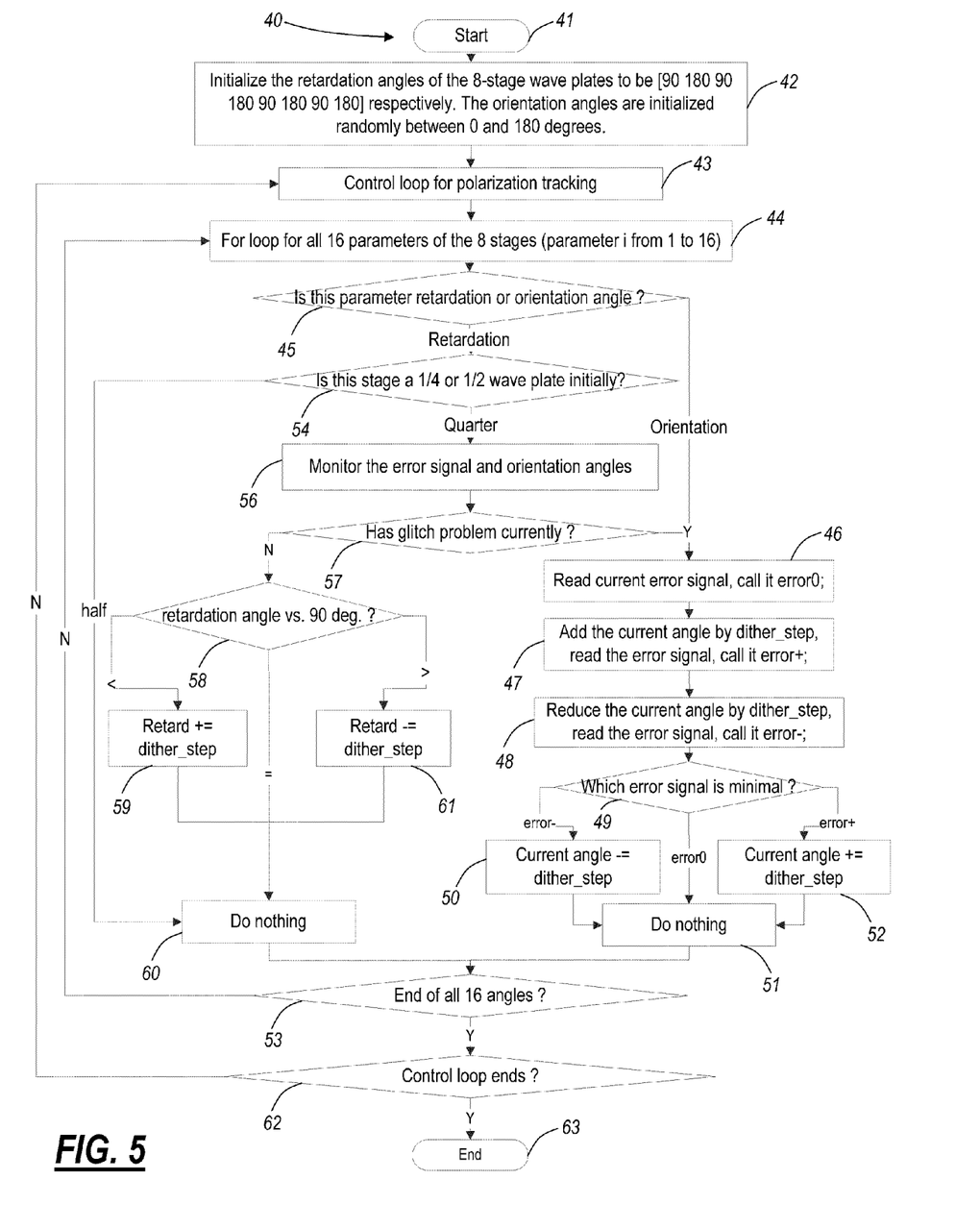
FIG. 5 is a flowchart of an implementation of the dithering algorithm of FIG. 3 on the eight-stage LiNbO$_3$ polarization controller of FIG. 4 according to an exemplary embodiment of the present invention.

Referring to FIG. 5, a flowchart illustrates an implementation 40 of the dithering algorithm 20 on the eight-stage LiNbO$_3$ polarization controller 30 according to an exemplary embodiment of the present invention. The implementation starts (step 41) by initializing the retardation angles of the wave plates 31 to be [90, 180, 90, 180, 80, 180, 90, 180 degrees] respectively, and the orientation angles are initialized randomly between 0 and 180 degrees (step 42). A control loop, i.e. an implementation of the dithering algorithm 20, begins polarization tracking (step 43). In this implementation 40, there are sixteen parameters, i.e. two for each of the eight stages of the polarization controller 30 with the two being the orientation angle and the retardation angle. A loop is performed for each of the sixteen parameters, i.e. parameter i from one to sixteen (step 44). The action taken for each of the parameters in the implementation 40 depends on whether the particular parameter in the loop in an orientation or retardation angle (step 45). In the dithering algorithm 20, retardation angles are only dithered when there is Glitch.

If the parameter i is an orientation angle (step 45), then the current error signal is read and denoted as error0 (step 46). The current orientation angle is added by a dither step (a predetermined amount) and the associated error signal is read and denoted as error+ (step 47). The current orientation angle is then reduced by the dither step and the associated error signal is read and denoted as error– (step 48). The implementation 40 adjusts the current orientation angle based on which of these error signals is minimal (step 49). If the error– is minimal, then the current angle setting is reduced by the dither step (step 50). If the error0 is minimal, then no action is taken on the current orientation angle setting (step 51). If the error+ is minimal, then the current orientation angle setting is increased by the dither step (step 52). After this, the control loop returns to step 44 to cycle through all parameters (step 53).

If the parameter i is a retardation angle (step 45), then in the wave plate is a half plate initially (step 54) no action is taken (step 55). After this, the control loop returns to step 44 to cycle through all parameters (step 53). If the wave plate is a quarter plate initially (step 54), then the error signals and orientation angles are monitored (step 56). From this monitoring, it can be determined whether there is a Glitch problem currently (step 57). If not, the wave plate is checked to see the current retardation angle in relation to 90 degrees (step 58). If the retardation angle is less than 90 degrees, the retardation angle is increased by the dither step (step 59). If the retardation angle equals 90 degrees, no action is taken (step 60), and if the retardation angle is greater than 90 degrees, the retardation angle is decreased by the dither step (step 61). Following steps 59, 60, 61, the control loop returns to step 44 to cycle through all parameters (step 53).

If there is a Glitch problem (step 57), the retardation angle is dithered in a similar fashion as the orientation angle. A current error signal is read and denoted as error0 (step 46). The current retardation angle is added by a dither step (a predetermined amount) and the associated error signal is read and denoted as error+ (step 47). The current retardation angle is then reduced by the dither step and the associated error signal is read and denoted as error– (step 48). The implementation 40 adjusts the current retardation angle based on which of these error signals is minimal (step 49). If the error– is minimal, then the current retardation angle setting is reduced by the dither step (step 50). If the error0 is minimal, then no action is taken on the current retardation angle setting (step 51). If the error+ is minimal, then the current retardation angle setting is increased by the dither step (step 52). After this, the control loop returns to step 44 to cycle through all parameters (step 53). After all parameters have cycled through (step 53), the control loop either performs another iteration (step 62) or ends (step 63).

Figure 6:
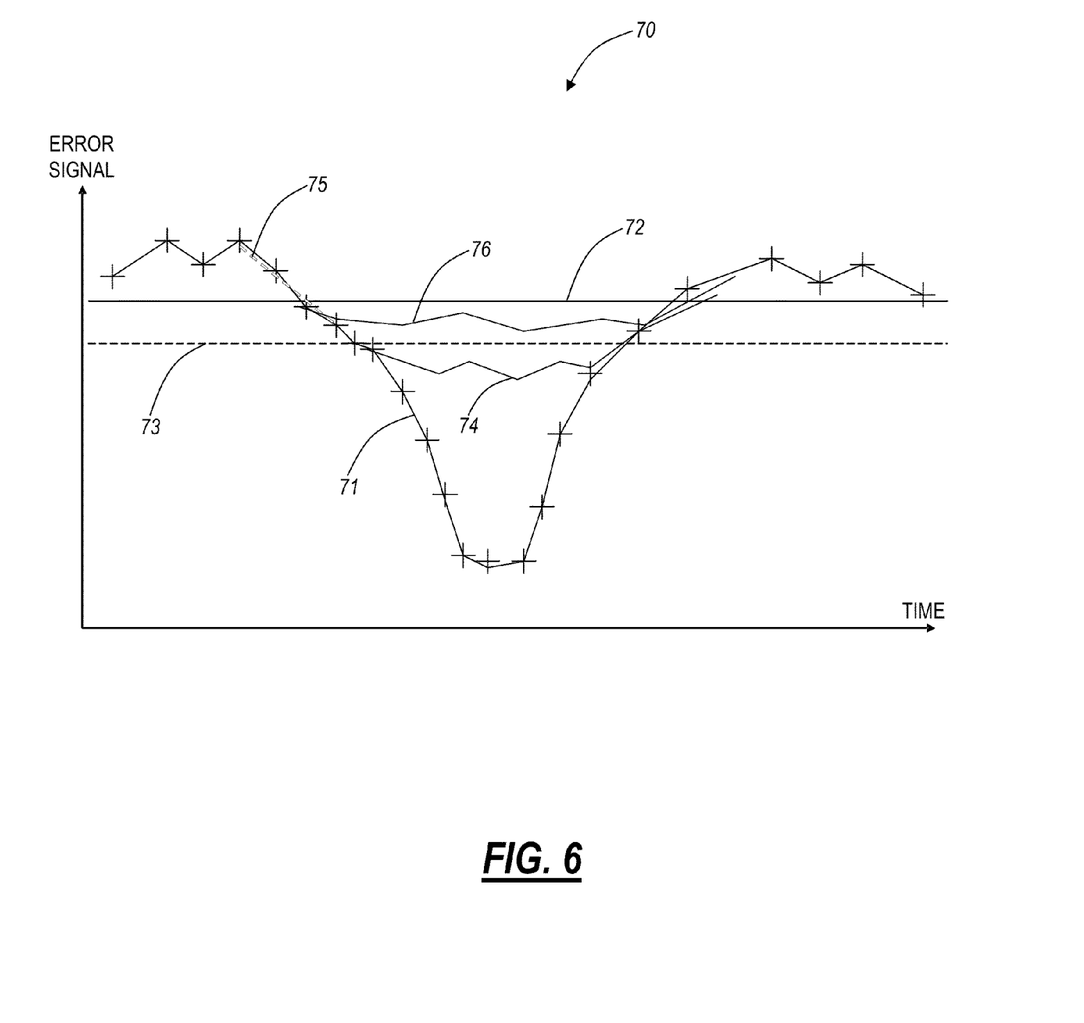
FIG. 6 is a chart illustrating a Glitch detection technique for use with a dithering algorithm according to an exemplary embodiment of the present invention.

Referring to FIG. 6, a chart 70 illustrates a Glitch detection technique for use with the dithering algorithm 20 according to an exemplary embodiment of the present invention. As discussed above, Glitch detection is critical in the proposed dithering algorithm 20. Earlier detection is always preferred before the polarization controlling device 12 traps deeper in the Glitch. The graph 70 is a plot of the error signal value versus time. Line 71 is an exemplary error signal when Glitch is happening. Here, the line 71 (the error signal) fluctuates over time and passes through a normal error signal level 72. One technique for detecting Glitch is to set an error signal threshold 73. Line 74 is an exemplary error signal uses this detection technique and the associated dithering algorithm 20. However, this Glitch detection technique can cause many unnecessary Glitch mode operations in the dithering algorithm 20 while fluctuations in the error signals become stronger. An improved technique is to monitor a trend 75 of error signals through curve fitting or other data processing techniques. Line 76 is an exemplary error signal using this improved Glitch detection technique. As shown in the line 76, Glitch is detected faster, i.e. the system enters Glitch mode faster, and the error signal recovers better than the line 74.

Figure 7:
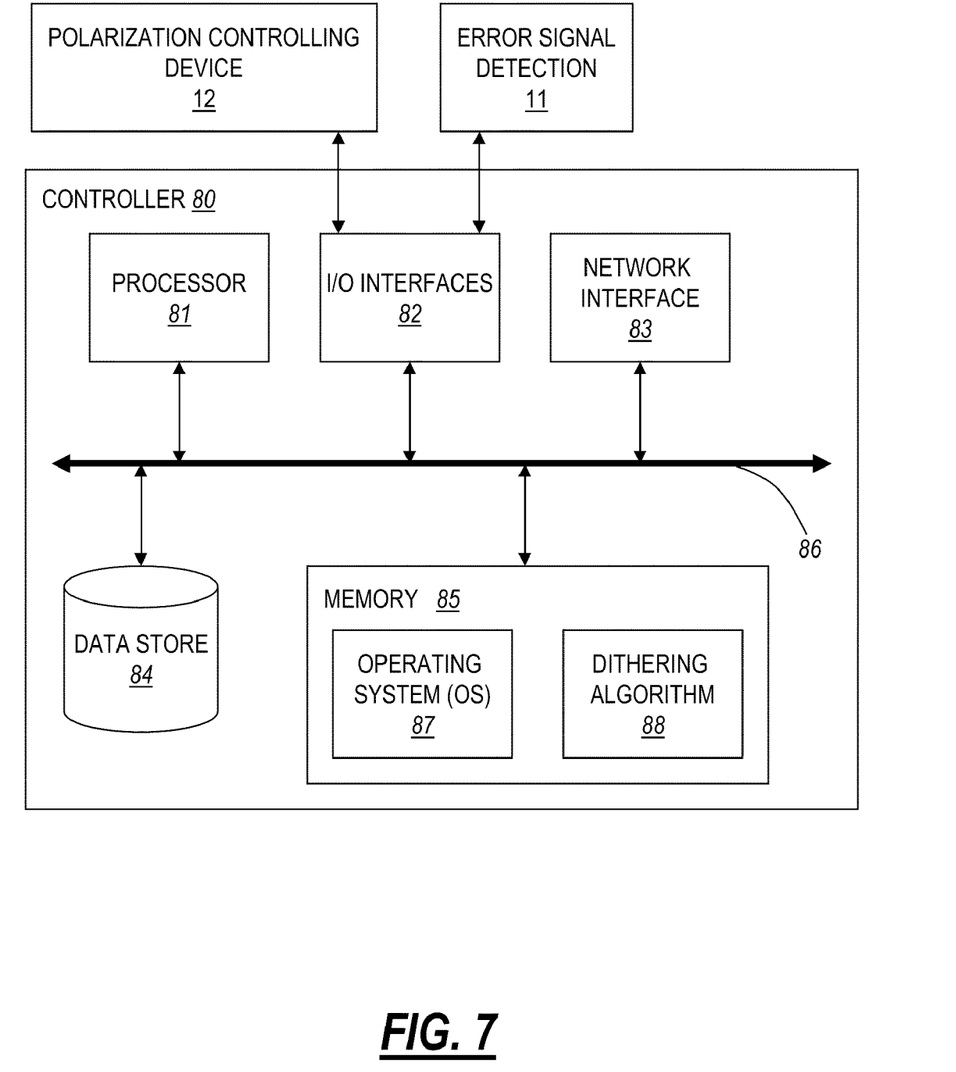
FIG. 7 is a controller for executing a dithering algorithm according to an exemplary embodiment of the present invention.

Referring to FIG. 7, a controller 80 is illustrated for executing the dithering algorithm 20 according to an exemplary embodiment of the present invention. The controller 80 can be part of the polarization control system 10, i.e. the control algorithm 13. The controller 80 can be a digital computer that, in terms of hardware architecture, generally includes a processor 81, input/output (I/O) interfaces 82, a network interface 83, a data store 84, and memory 85. The components (81, 82, 83, 84, and 85) are communicatively coupled via a local interface 86. The local interface 86 can be, for example but not limited to, one or more buses or other wired or wireless connections, as is known in the art. The local interface 86 can have additional elements, which are omitted for simplicity, such as controllers, buffers (caches), drivers, repeaters, and receivers, among many others, to enable communications. Further, the local interface 86 can include address, control, and/or data connections to enable appropriate communications among the aforementioned components.

The processor 81 is a hardware device for executing software instructions. The processor 81 can be any custom made or commercially available processor, a central processing unit (CPU), an auxiliary processor among several processors associated with the controller 80, a semiconductor-based microprocessor (in the form of a microchip or chip set), or generally any device for executing software instructions. When the controller 80 is in operation, the processor 81 is configured to execute software stored within the memory 85, to communicate data to and from the memory 85, and to generally control operations of the controller 80 pursuant to the software instructions. The I/O interfaces 82 can be used to receive user or system input and/or for providing system output to one or more devices or components. User input can be provided via, for example, a keyboard and/or a mouse. System output can be provided via a display device and a printer (not shown). I/O interfaces 81 can include, for example, a serial port, a parallel port, a small computer system interface (SCSI), an infrared (IR) interface, a radio frequency (RF) interface, and/or a universal serial bus (USB) interface. Specifically, the controller 80 can connect to the error signal detection 11 component and the polarization controlling device 12 through the I/O interfaces 81.

The network interface 83 can be used to enable the controller 80 to communicate on a network, such as to a client or the like. The network interface 83 can include, for example, an Ethernet card (e.g., 10BaseT, Fast Ethernet, Gigabit Ethernet) or a wireless local area network (WLAN) card (e.g., 802.11a/b/g/n). The network interface 83 can include address, control, and/or data connections to enable appropriate communications on the network. The data store 84 can be used to store data, such as configuration data, parameter settings of the polarization controlling device 12, and the like. The data store 84 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 84 can incorporate electronic, magnetic, optical, and/or other types of storage media. The memory 85 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 85 may incorporate electronic, magnetic, optical, and/or other types of storage media. Note that the memory 85 can have a distributed architecture, where various components are situated remotely from one another, but can be accessed by the processor 81.

The software in memory 85 can include one or more software programs, each of which includes an ordered listing of executable instructions for implementing logical functions. In the example of FIG. 7, the software in the memory system 2210 includes a suitable operating system (O/S) 87 and a dithering algorithm program 88. The operating system 87 essentially controls the execution of other computer programs, and provides scheduling, input-output control, file and data management, memory management, and communication control and related services. The operating system 87 can be any of Windows NT, Windows 2000, Windows XP, Windows Vista, Windows Server (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), a Real-Time Operating System (RTOS), or the like.

The dithering algorithm program 88 can include the steps described herein for the present invention, such as the dithering algorithm 20 and/or the implementation 40. Specifically, the controller 80 is configured to receive an error signal value over time from the error signal detection 11, to process the received error signal value, and to determine settings for the polarization controlling device 12 based on processed error signal value. Also, the various actions described herein for polarization control can be performed by specific circuits (e.g., field programmable gate array (FPGA) or application specific integrated circuits (ASICs)), by program instructions being executed by in the controller 80, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various exemplary embodiments of the invention can be embodied in a number of different forms, all of which have been contemplated to be within the scope of the claimed subject matter. In addition, for each of the embodiments described herein, the corresponding form of any such embodiments may be described herein as, for example, "logic configured to" perform the described action. The controller 80 performs a portion or all of the processing steps of the present invention in response to the processor 81 executing one or more sequences of one or more instructions contained in the memory 85. Such instructions can be read into the memory 85 from another computer readable medium, such as the data store 84 or the like. In alternative embodiments, hard-wired circuitry can be used in place of or in combination with software instructions. Thus, the present invention is not limited to any specific combination of hardware circuitry and software.

Stored on any one or on a combination of computer readable media, the present invention includes ordered instructions for controlling the polarization control system 10 or the like. Such software may include, but is not limited to, device drivers, operating systems, development tools, and applications software. Such computer readable media further includes the computer program product of the present invention for performing all or a portion (if processing is distributed) of the processing performed in implementing the invention. The term "computer readable medium" as used herein refers to any medium that participates in providing instructions to the processor 81 for execution. A computer readable medium can take many forms, including but not limited to, non-volatile media, volatile media, and transmission media. Non-volatile media includes, for example, optical, magnetic disks, and magneto-optical disks, such as the hard disk or the removable media drive. Volatile media includes dynamic memory, such as the main memory. Transmission media includes coaxial cables, copper wire and fiber optics, including the wires that make up the bus. Various forms of computer readable media can be involved in carrying out one or more sequences of one or more instructions to the processor 81 for execution.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A polarization control system, comprising:
   a polarization controlling device comprising variable orientation angles and variable retardation angles;
   an error signal detector configured to detect an error signal associated with the polarization controlling device; and
   a control algorithm configured to execute a dithering algorithm on the polarization controlling device responsive to the error signal, wherein the error signal represents Glitch.

2. The polarization control system of claim 1, wherein the polarization controlling device comprises any mechanically or electrically driven component that can be modeled as a plurality of wave plates with variable orientation angles and variable retardation angles.

3. The polarization control system of claim 2, wherein the plurality of wave plates comprises at least four.

4. The polarization control system of claim 3, wherein the variable retardation angles are each initialized to at least two different values.

5. The polarization control system of claim 4, wherein the control algorithm is configured to:
   operate normally by dithering the variable orientation angles responsive to the error signal;
   upon detection of Glitch, operate by dithering the variable orientation angles and at least one of the variable retardation angles responsive to the error signal; and
   upon Glitch correction, stop dithering the at least one of the variable retardation angles and operate normally by dithering the variable orientation angles responsive to the error signal.

6. The polarization control system of claim 5, wherein the control algorithm is further configured to:
   return the at least one of the variable retardation angles to one of the at least two different values upon the Glitch correction.

7. The polarization control system of claim 5, wherein the detection of Glitch comprises one of setting an error signal threshold whereby Glitch is detected once the error signal reaches the error signal threshold and monitoring trends of the error signal through curve fitting.

8. The polarization control system of claim 2, wherein the polarization controlling device comprises one of a cascaded electromagnetic fiber squeezer, an endlessly rotatable optical retardation plate, a liquid crystal polarization rotator, and a guided-wave electro-optic device.

9. The polarization control system of claim 1, wherein the dithering algorithm comprises:
   adjusting a parameter associated with polarization controlling device in a predetermined amount in both a positive direction and a negative direction;
   measuring the error signal at each of an initial unadjusted position, the positive direction, and the negative direction; and
   setting the parameter to minimize the error signal.

10. A polarization control method, comprising:
    initializing retardation angles of a polarization controller to at least two different values;
    operating the polarization controller by dithering orientation angles of the polarization controller to minimize an error signal associated with the polarization controller;
    responsive to detecting Glitch, operating the polarization controller by dithering orientation angles of the polarization controller and at least one retardation angle to minimize an error signal associated with the polarization controller; and
    responsive to correcting the Glitch, stopping dithering of the at least one retardation angle and operating the polarization controller by dithering orientation angles of the polarization controller to minimize an error signal associated with the polarization controller.

11. The polarization control method of claim 10, further comprising:
    resetting the at least one retardation angle to one of the at least two different values.

12. The polarization control method of claim 10, further comprising:
    detecting an error signal of the polarization controller; and
    performing the dithering orientation angles and the at least one retardation angle responsive to the error signal.

13. The polarization control method of claim 12, wherein detecting Glitch comprises one of setting an error signal threshold whereby Glitch is detected once the error signal reaches the error signal threshold and monitoring trends of the error signal through curve fitting.

14. The polarization control method of claim 10, wherein the polarization controller comprises any mechanically or electrically driven component that can be modeled as a plurality of wave plates with variable orientation angles and variable retardation angles.

15. The polarization control method of claim 14, wherein the plurality of wave plates comprises at least four.

16. The polarization control method of claim 10, wherein dithering comprises:
    adjusting an angle value in a predetermined amount in both a positive direction and a negative direction;
    measuring the error signal at each of an initial unadjusted position, the positive direction, and the negative direction; and
    setting the parameter to minimize the error signal.

17. A dithering polarization control method, comprising:
    setting retardation angles on a plurality of wave plates to at least two different values;
    monitoring an output of the plurality of wave plates to derive an error signal;
    for each orientation angle for each of the plurality of wave plates performing the steps of adding a dither value to a current value and measuring the error signal, subtracting the dither value from the current value and measuring the error signal, and setting a new value based on the minimum error signal between the current value, the added dither value, and the subtracted dither value;
    monitoring for glitch; and
    if glitch is detected, for each retardation angle for each of the plurality of wave plates performing the steps of adding a dither value to a current value and measuring the error signal, subtracting the dither value from the current value and measuring the error signal, and setting a new value based on the minimum error signal between the current value, the added dither value, and the subtracted dither value.

18. The dithering polarization control method of claim 17, further comprising:

slowly resetting each retardation angle for each of the plurality of wave plates to the at least two different values.

19. The dithering polarization control method of claim 17, wherein detecting Glitch comprises one of setting an error signal threshold whereby Glitch is detected once the error signal reaches the error signal threshold and monitoring trends of the error signal through curve fitting.

20. The dithering polarization control method of claim 17, wherein the polarization controller comprises any mechanically or electrically driven component that can be modeled as a plurality of wave plates with variable orientation angles and variable retardation angles.

* * * * *